(12) United States Patent
Randall et al.

(10) Patent No.: US 6,530,031 B1
(45) Date of Patent: Mar. 4, 2003

(54) METHOD AND APPARATUS FOR TIMING DURATION OF INITIALIZATION TASKS DURING SYSTEM INITIALIZATION

(75) Inventors: David Lee Randall, Leander, TX (US); David Ross Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,113

(22) Filed: Nov. 8, 1999

(51) Int. Cl.[7] .......................... G06F 1/14; G06F 15/177
(52) U.S. Cl. ..................... 713/502; 713/2; 714/36; 710/10
(58) Field of Search ................. 713/502, 2; 714/36, 714/10; 710/10

(56) References Cited

U.S. PATENT DOCUMENTS 4,951,681 A * 8/1990 Mortara ..................... 346/136
6,016,466 A * 1/2000 Guinther et al. ............ 702/186
6,058,475 A * 5/2000 McDonald et al. ............ 713/2
6,122,663 A * 9/2000 Lin et al. .................... 709/100

* cited by examiner

Primary Examiner—Thomas Lee
Assistant Examiner—Suresh K Suryawanashi
(74) Attorney, Agent, or Firm—Duke W. Yee; Mark E. McBurney; Christopher P. O'Hagan

(57) ABSTRACT

A method and apparatus to provide accurate and automated timing of firmware routines, such as initialization tasks at boot time, is provided. Since each task sends a progress indicator code to a display buffer when it starts to run, by saving processor time stamps at the time these codes change, it is possible to calculate and store the time duration for each routine. In the case of system initialization, these time durations can be an indication of problems if they are much longer than normal or an indication of excessive, inefficient, or ineffective processing that might be speed up in order to reduce the total boot time.

21 Claims, 2 Drawing Sheets

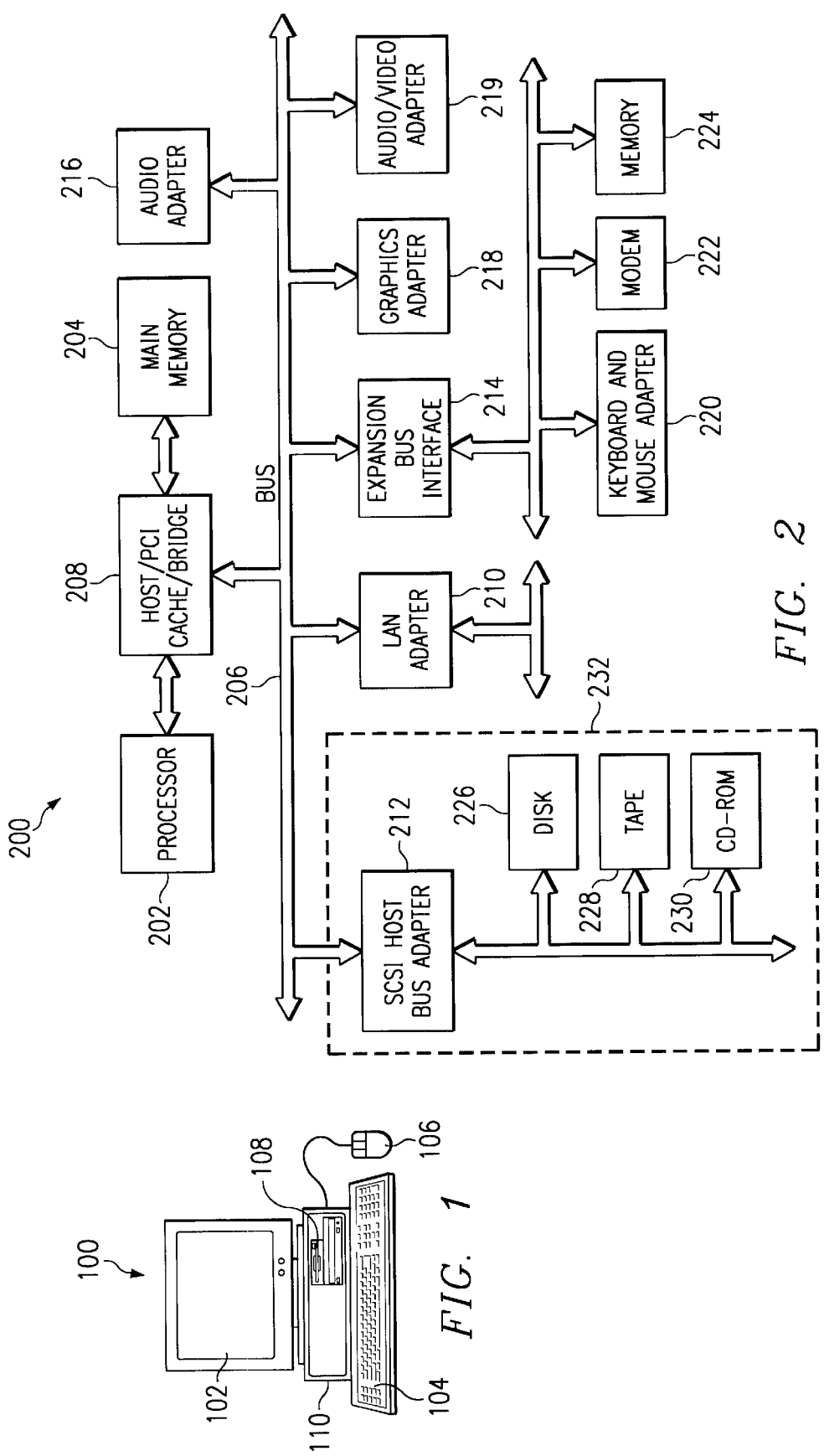

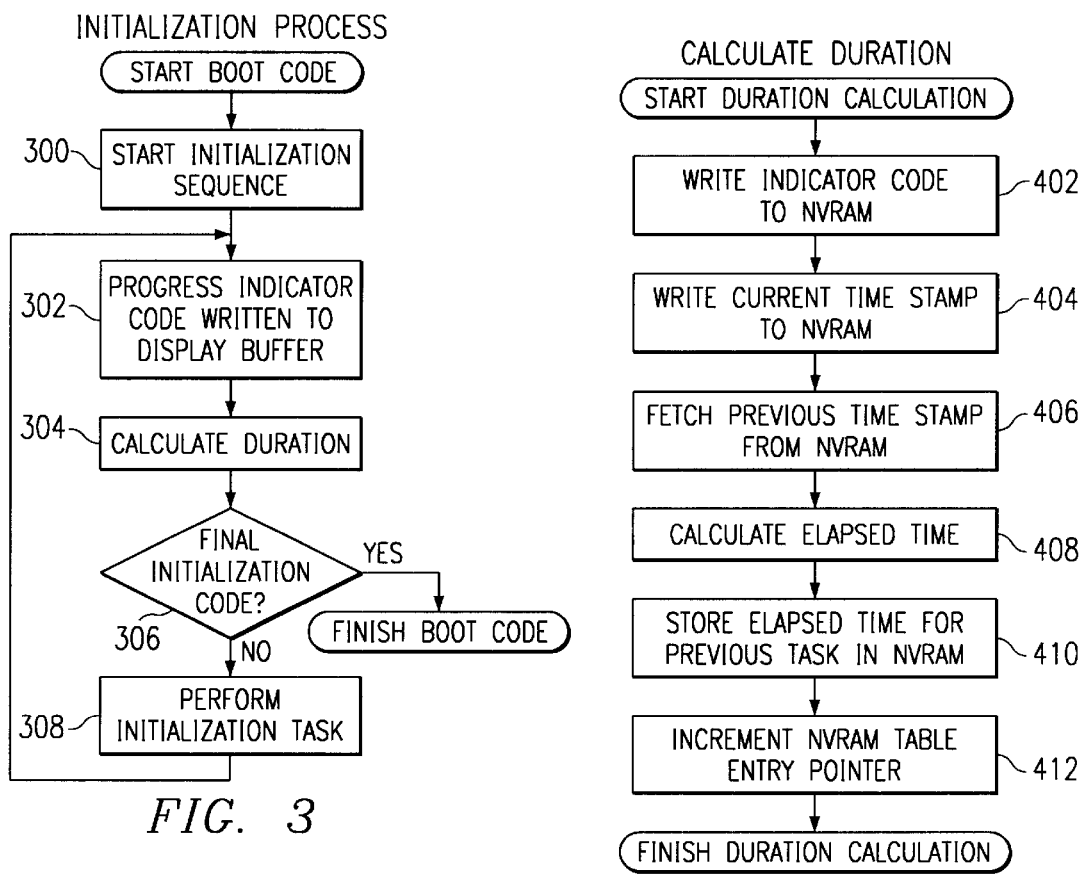

METHOD AND APPARATUS FOR TIMING DURATION OF INITIALIZATION TASKS DURING SYSTEM INITIALIZATION

BACKGROUND OF THE INVENTION

1. Technical Field

The present invention relates generally to an improved data processing system and in particular to a method and an apparatus for improving boot ROM and operating system initialization. Still more particularly, the present invention provides a method to accurately measure time durations for tasks during system initialization.

2. Description of the Related Art

An operating system (OS) is essential for any general-purpose computer. The OS provides the fundamental layer of software between the user or application program and the computer hardware. Some of the services provided by a typical operating system are program execution, input/output (I/O) operations, file-system manipulation, communication, error detection, resource allocation, accounting, and protection. A typical OS may be command-line oriented (e.g., AIX, Advanced Interactive Executive) or windows-oriented (e.g., OS/2).

Loading and running the operating system is accomplished by using a bootstrap program. Normally, starting the OS is a two step process. There is a "simple" boot program that is usually stored in the system ROM (Read Only Memory). This program needs no initialization. The job of the ROM boot program is to initialize registers in the CPU (Central Processing Unit), initialize device controllers, such as for the system disk and memory, and initialize memory contents. The ROM boot program can read and write to memory and can load from a boot block oh the system disk. This boot block contains a more complex boot program that actually loads the operating system itself.

An operating system (OS) is a large, complex program that provides a wide variety of services. The entire OS need not be resident in memory at all times. However there is a small kernel that is always resident in main memory. The kernel does not run as a thread (a stream of execution) and so it cannot be pre-empted. The kernel cannot be paged out to disk, that is, it cannot be removed from memory and written to the swap space on a disk. The kernel contains the most frequently used functions in the operating system, including thread scheduling, process switching, exception and interrupt handling, and multiprocessor synchronization.

The job of the "complex" boot program loaded from the boot block on the system disk is to locate the operating system kernel, load the kernel into memory, and then transfer instruction control to the initial address in the kernel. The operating system itself goes through initialization, as users can observe by periodic status messages appearing on the screen. Depending on the size of the operating system and complexity of the computer system, this process can take tens of seconds, minutes, or even tens of minutes. In order to improve this initialization process, it would be advantageous to have precise timing measurements for each of the tasks in the initialization process.

Typically the initialization routines for each of the processes or devices have not been written with "instrumentation" code that allows timing of the code itself. Instrumenting each piece of code would be time consuming and dangerous if, as a result, the code does not function properly. In the past, "ad hoc" techniques have been used to provide timings for each of the initialization steps. A pencil, paper, and stopwatch does not provide accurate readings, particularly on a modern system with the CPU clock speed in the hundreds of millions of instructions per second. Although initialization can be laborious, many steps occur too quickly to allow for hand measurements. Capturing screen images or other initialization indications internally during initialization is not feasible since access to system resources for storage may not be available yet. Externally videotaping the screen is possible, but this is a cumbersome process and readings may not be any more accurate than the stopwatch method.

Therefore, it would be advantageous to have a method and apparatus to perform the system initialization timing measurements in an unobtrusive, accurate, and automated manner.

SUMMARY OF THE INVENTION

The present invention discloses a method and apparatus to provide accurate and automated timing of firmware routines, such as initialization tasks at boot time. Since each task sends a progress indicator code to a display buffer when it starts to run, by saving processor time stamps at the time these codes change, it is possible to calculate and store the time duration for each routine. In the case of system initialization, these time durations can be an indication of problems if they are much longer than normal or an indication of excessive, inefficient, or ineffective processing that might be speeded up in order to reduce the total boot time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented;

FIG. 2 is a block diagram illustrating a data processing system in which the present invention may be implemented;

FIG. 3 is a flowchart of the system initialization process in accordance with a preferred embodiment of the present invention;

FIG. 4 is a flowchart of the time duration calculation in accordance with a preferred embodiment of the present invention;

FIG. 5 is a sample initialization table built in accordance with a preferred embodiment of the present invention; and FIG. 6 is a sample calculation of time duration in accordance with a preferred embodiment of the present invention.

DETAILED DESCRIPTION OF THE PREFERRED EMBODIMENT

With reference now to the figures and in particular with reference to FIG. 1, a pictorial representation depicting a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines corporation, located in Armonk, N.Y. Although the depicted representation shows a personal computer, other embodiment of the present invention may be implemented in other types of data processing systems, such as network workstations, mainframe computers, etc. Computer 100 also preferably includes a graphical user interface that may be implemented by means of systems software residing in computer readable media in operation within computer 100.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. Instructions for the operating system, applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. The depicted example in FIG. 2 and above-described examples are not meant to imply architectural limitations.

With reference now to FIG. 3, a flowchart shows the initialization process in accordance with a preferred embodiment of the present invention. The boot code contains a sequence of initialization steps, each step identified by a progress indicator code. The boot code may be a master boot program responsible for calling initialization tasks in their proper sequence. Each initialization task, whether called during initial system boot or during the loading of the operating system, calls a low level routine that displays the progress indicator code. The time duration calculation, described further below, is embedded in this routine to display the progress indicator code.

After loading the first initialization program from ROM (step 300), each initialization task calls a routine to display a progress indicator code (step 302). The time duration calculation is performed immediately after the progress indicator code is stored (step 304). The details of this calculation are given in FIG. 4. There is a particular progress indicator code that indicates the end of system initialization. If this "final" code is detected (step 306) then the boot process is finished and the durations for each of the initialization tasks have been calculated and stored. If the progress indicator code is not the final code, then the next initialization task is performed (step 308) and control returns to step 302 where the progress indicator code is sent to the display buffer for the next task.

With reference now to FIG. 4, a flowchart shows the time duration calculation in accordance with a preferred embodiment of the present invention. This figure is an expansion of step 304 shown in FIG. 3. The time duration is calculated for the initialization task that has been completed, hereafter called task one, and stores table entries for the task to be executed next, hereafter called task two. A complete description of the data stored in the table is given in FIG. 5 below.

The progress indicator code is read from the display buffer (step 402) and written to non-volatile random access memory (NVRAM). The current value of the processor time base register is read and written (step 404) to non-volatile random access memory (NVRAM). Hereafter, the value of the processor time base register is referred to as the time stamp. This value indicates the number of ticks of the processor clock. If nonvolatile RAM memory is not available yet, then the progress indicator code and time stamp are stored in program RAM until, at a later time, NVRAM becomes available, and the information previously stored in program RAM is transferred to NVRAM at that time.

Each task entered in the initialization table has three associated values: the progress indicator code, the time stamp when the task begins, and the calculated time duration in milliseconds. The duration calculation also maintains a data entry point into the table so that data already recorded can be accessed and new data can be entered. The duration of task one is calculated when task two is ready to start (or when the initialization process is completed). The time stamp for task one is read from NVRAM (step 406) and used to calculate the elapsed time in milliseconds (step 408) for task one. The details of this calculation are explained in the description for FIG. 6 below. The calculated time duration for task one is stored in the table (step 410). The three entries in the table take a total of 16 bytes, so the data entry point into the NVRAM table is advanced by 16 as the last step in the duration calculation (step 412). The duration calculation is now complete.

With reference now to FIG. 5, an initialization table shows the data values stored for each task during the initialization process in accordance with a preferred embodiment of the present invention. Column 502 contains the progress indicator code for each task. Column 504 contains the time stamp value for each task, which is the content of the processor time base register at the time the task was started. Column 506 is the calculated duration of each task in milliseconds. In the table shown, tasks 0100, 0202, and 0301 have completed and their durations have been calculated. Task 0405 is either beginning its execution or is currently running, but task 0405 has not completed since its duration field is blank.

With reference now to FIG. 6, a sample calculation of time duration in accordance with a preferred embodiment of the present invention is shown. The number of processor ticks per millisecond needs to be calculated based on the actual processor speed. For example, if the processor frequency is 200 MHz, then there are 200,000 ticks per millisecond. This constant value is fixed for a particular processor and is needed in calculating the duration value. The calculation shown is for task 0202 based on the data given in FIG. 5. This calculation would be performed when progress indicator code for the next task, code 0301, is received. The progress indicator code 0301 and the current time stamp, 630,000,000, are entered in the table, corresponding to steps 402 and 404 in FIG. 4. The previous time stamp, 450,000,000, is retrieved (step 406 in FIG. 4) and subtracted from the current value giving a duration of 180,000,000 ticks. This is divided by the constant of 200,000 ticks per millisecond to give a duration of 900 milliseconds (step 408 in FIG. 4). The 900 msec is entered in the table as the time duration for task 0202 (step 410 in FIG. 4).

The duration data stored in NVRAM can be accessed via an Operating System or firmware utility. The duration data can be accessed and analyzed after the initialization program completes; this step is optional. The advantages of the present invention should be apparent in view of the detailed description of the invention provided above. Unlike older techniques that require human intervention to make crude measurements of time durations for initialization tasks, the current invention automatically and accurately measures the duration of every initialization task that displays a progress indicator code. Since each initialization task generates a progress indicator code, it was not necessary to change the initialization tasks themselves to measure these durations. These duration values are useful for determining tasks that may be having problems indicated by duration times much longer than normal or tasks that could benefit from optimization in order to reduce the total boot time.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The preferred embodiment illustrated timing of tasks during system initialization, however the same approach of using progress indicator codes could be applied at other times when the system is running. For example, some runtime operations involve entering a firmware subroutine with corresponding progress indicator codes. These subroutines could be timed using the methods outlined in this invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for timing a system initialization task, the method comprising the computer-implemented steps of:

storing a progress indicator code and a time stamp in an initialization table;

calculating a time duration for a task and storing it in the initialization table; and maintaining the initialization table for all completed tasks.

2. The method in claim 1, wherein the time stamp is a value stored in a processor time base register.

3. The method in claim 1, wherein the progress indicator code, the time stamp, and the time duration are stored in nonvolatile, system RAM memory.

4. The method in claim 3, wherein the progress indicator code, the time stamp, and the time duration are stored in internal program RAM if nonvolatile, system RAM memory is not available yet.

5. The method in claim 4, wherein the data stored in internal program RAM are transferred to nonvolatile, system RAM memory once it becomes available.

6. The method in claim 1, wherein the progress indicator code is associated with the start of each initialization task.

7. The method in claim 1, wherein a difference between two successive time stamps is divided by a constant derived from a processor time base frequency to obtain a duration measured in milliseconds.

8. The method in claim 1, wherein the initialization table contains the progress indicator code, the time stamp and the time duration for each task.

9. A data processing system for timing system initialization tasks, the data processing system comprising:

a storing means for storing the progress indicator code and a time stamp in an initialization table;

a calculating means for calculating a time duration for the task and storing it in the initialization table; and a maintaining means for maintaining the initialization table for all completed tasks.

10. The data processing system in claim 9, wherein the time stamp is a value stored in a processor time base register.

11. The data processing system in claim 10, wherein the progress indicator code, the time stamp, and the time duration are stored in nonvolatile, system RAM memory.

12. The data processing system in claim 11, wherein the progress indicator code, the time stamp, and the time duration are stored in internal program RAM if nonvolatile, system RAM memory is not available yet.

13. The data processing system in claim 12, wherein the data stored in internal program RAM are transferred to nonvolatile, system RAM memory once it becomes available.

14. The data processing system in claim 9, wherein the progress indicator code is associated with the start of each initialization task.

15. The data processing system in claim 9, wherein the difference between two successive time stamps is divided by a constant derived from a processor time base frequency to obtain a time duration measured in milliseconds.

16. The data processing system in claim 9, wherein the initialization table contains a progress indicator code, a time stamp, and a time duration for each task.

17. A computer program product on a computer-readable medium for use in a system initialization process, the computer program product comprising:

instructions for storing a progress indicator code and a time stamp for a task in nonvolatile system RAM;

instructions for calculating a time duration for the task; and instructions for building an initialization table for all initialization tasks.

18. The computer program product in claim 17, wherein the time stamp is the value of a processor time base register.

19. The computer program product in claim 17, wherein the progress indicator code is a code associated with the start of each initialization task.

20. The computer program product in claim 17, wherein the difference between two successive time stamps is divided by a constant derived from a processor time base frequency to obtain a time duration measured in milliseconds.

21. The computer program product in claim 17, wherein the initialization table contains a progress indicator code, a time stamp, and a time duration for each task.

* * * * *